Jan. 3, 1933.     B. DICK     1,893,072
FUEL ECONOMIZER
Filed March 17, 1930
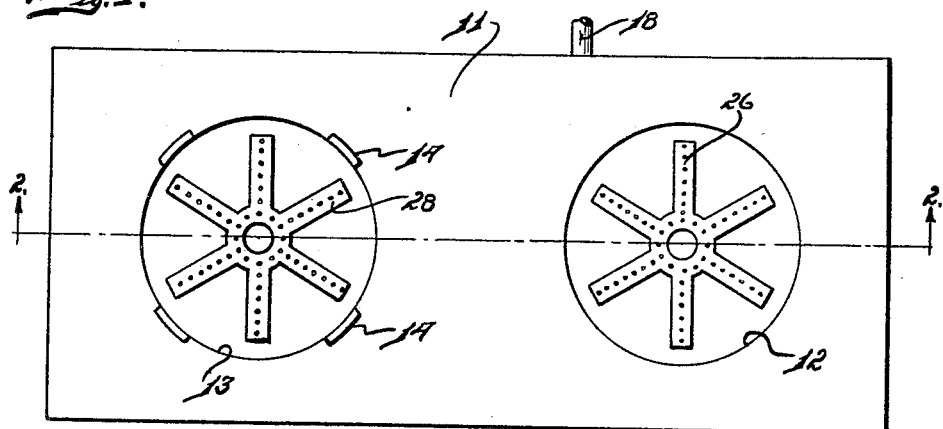
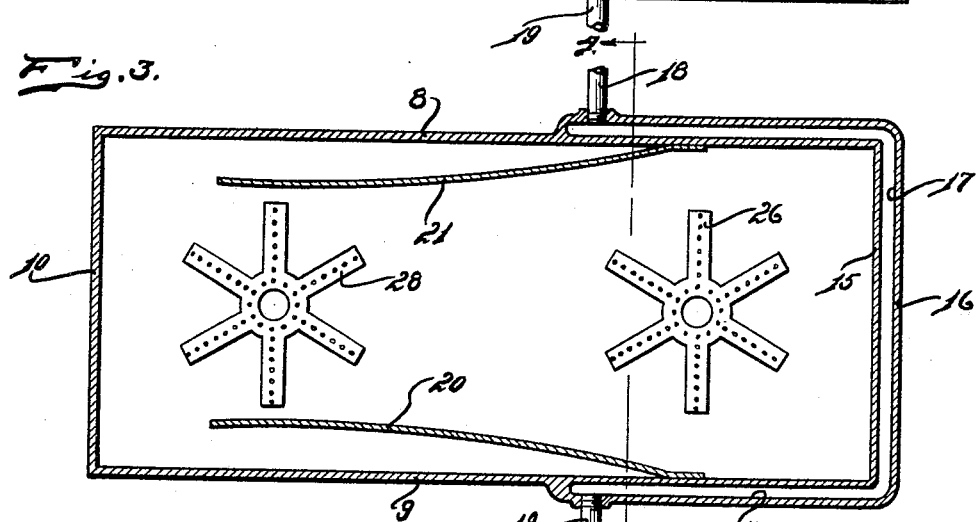
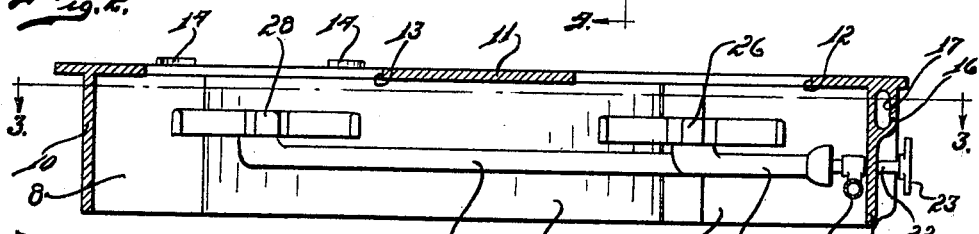
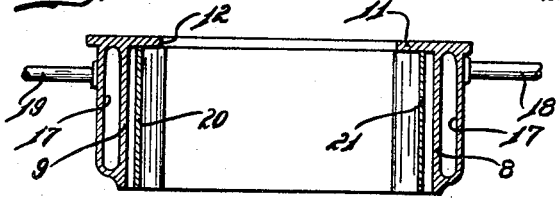
INVENTOR.
Bismarck Dick
BY Thos. Donnelly
ATTORNEY.

Patented Jan. 3, 1933

1,893,072

UNITED STATES PATENT OFFICE

BISMARCK DICK, OF MELVINDALE, MICHIGAN

FUEL ECONOMIZER

Application filed March 17, 1930. Serial No. 436,429.

My invention relates to a new and useful improvement in a fuel economizer for cook stoves and adapted particularly for use in electric or gas stoves. It is an object of the present invention to provide a device which may be positioned over the burner of a cook stove so as to enclose the same and serve to direct heat which ordinarily would escape from a burner being used to an adjacent burner whereby the deflected heat may be utilized for heating purposes.

It is another object of the present invention to provide a device of this class which, in addition to serving as a means for utilizing heat which is ordinarily lost for heating a cooking utensil will also serve as a means for heating hot water.

It is another object of the invention to provide a device of this class which will be simple in structure, economical of manufacture, and highly efficient in use.

Other objects will appear hereinafter.

The invention consists in the combination and arrangement of parts hereinafter described and claimed.

The invention will be best understood by a reference to the accompanying drawing which form a part of this specification and in which, Fig. 1 is a top plan view of the invention.

Fig. 2 is a sectional view taken on line 2—2 of Fig. 1.

Fig. 3 is a sectional view taken on line 3—3 of Fig. 2.

Fig. 4 is a sectional view taken on line 4—4 of Fig. 3.

The invention is preferably formed from metal and in the drawing I have shown it in use in connection with gas burners. The invention embodies a box-like frame which is preferably formed rectangular shaped with the side walls 8 and 9 connected by the end wall and having a top plate 11 in which are formed openings 12 and 13 adapted when in use to register with the burners of the stove. Bosses 14 are mounted around the opening 13 to retain a vessel in slightly elevated relation to the top 11. The end wall 15 cooperates with an outer wall 16 to form a compartment 17 into which water may be delivered by the pipe 18 and from which water may be delivered by the pipe 19 thus forming a water jacket on a portion of the structure. Deflecting plates 20 and 21 are mounted in the inner surfaces of the side walls 9 and 8 so as to direct the lost heat from the gas burner 28 which is lit so that a vessel placed on the top 11 over the opening 12 will be heated by the deflected waste heat. A valve stem 22 having the hand grip 23 is used to control the delivery of gas from the gas supply pipe 24 to the delivery pipe 25 which connects with the gas burner 26. A similar connection is made for the delivery pipe 27 which connects to the gas burner 28.

In use when the burner 28 is lighted, the waste heat will be deflected so as to heat a vessel placed over the opening 12 at the same time this waste heat will serve to heat the water in the space 17 thus there is formed a means for providing a supply of hot water and at the same time for utilizing the waste heat for heating a vessel placed in proximity to the lighted burner. The water jacketed portion of the frame extends so as to embrace the burner 26 but does not extend across the transverse medial line of the frame. This formation permits a maximum utilization of the waste heat while permitting a maximum heating by the burner 28, where a concentrated heat is desired.

While I have illustrated and described the preferred form of my invention, I do not wish to limit myself to the precise details of structure shown but desire to avail myself of such variations and modifications as may come within the scope of the appended claims.

Having thus described my invention what I claim as new and desire to secure by Letters Patent is:

A device of the class described, comprising: a box-like frame having side walls and end walls and a top, said top being provided with spaced openings at opposite sides of the transverse medial line of said frame, said frame adjacent one end being double walled to provide a water receiving compartment and to provide a water jacket, said water jacket embracing one of said openings and lying wholly on the same side of the transverse medial line of said frame as said opening; deflecting plates mounted at one end on the inner surface of said side walls at the water jacketed portion and extending inwardly toward each other at their opposite ends and lying at opposite sides of the other of said openings for deflecting heat within said frame towards the water jacketed end.

In testimony whereof I have signed the foregoing specification.

BISMARCK DICK.